United States Patent
Nishijima

[11] Patent Number: 6,130,388
[45] Date of Patent: Oct. 10, 2000

[54] KEYBOARD DEVICE

[75] Inventor: Akio Nishijima, Fukushima-ken, Japan

[73] Assignee: Alps Electric Co., Ltd., Tokyo, Japan

[21] Appl. No.: 09/158,729

[22] Filed: Sep. 22, 1998

[30] Foreign Application Priority Data

Sep. 22, 1997 [JP] Japan ................... 9-257348

[51] Int. Cl.[7] ................................................ H05K 7/20
[52] U.S. Cl. ...................... 200/293; 361/687; 361/689
[58] Field of Search .................. 174/252, 15.1, 174/16.1, 15.2; 200/5 R, 5 A, 512–517, 293, 294, 296, 303, 306, 307; 361/687–689, 699, 700–704, 709, 711–714

[56] References Cited

U.S. PATENT DOCUMENTS

| 5,313,362 | 5/1994 | Hatada et al. | 361/709 |
| 5,383,340 | 1/1995 | Larson et al. | 62/259.2 |
| 5,568,360 | 10/1996 | Penniman et al. | 361/687 |
| 5,757,615 | 5/1998 | Donahoe et al. | 361/687 |
| 5,764,483 | 6/1998 | Ohashi et al. | 361/699 |
| 5,805,417 | 9/1998 | Nakagawa et al. | 361/687 |

FOREIGN PATENT DOCUMENTS 8303971A  11/1996  Japan ............... F28D 15/02

*Primary Examiner*—Michael Friedhofer
*Attorney, Agent, or Firm*—Brinks Hofer Gilson & Lione

[57] ABSTRACT

In a keyboard device, a cooling heat pipe containing a coolant is formed integrally with a support plate. The cooling heat pipe is incorporated in a personal computer in close proximity to an IC component that generates a large quantity of heat, it is possible to cool both IC component and switch member. It is therefore possible to suppress elongation of the sheets that comprise the switch member. The keyboard is kept free of any contact defect formed as a result of this expansion due to heating and subsequent contraction due to cooling.

4 Claims, 4 Drawing Sheets

KEYBOARD DEVICE

BACKGROUND OF THE INVENTION

1. Field of the Invention

The present invention relates to a keyboard device suitable for use in a notebook type personal computer.

2. Description of the Related Art

As shown in FIGS. 9 and 10, a keyboard device K used in a conventional notebook type personal computer has a support plate 21 constituted by a flat metallic plate, with a switch member 22 being mounted on the support plate 21.

The switch member 22 has a sheet 23 for fixed contacts formed by a filmy insulator, a sheet 24 for a spacer formed by filmy insulator on the sheet 23, and a sheet 25 for movable contacts formed by a filmy insulator on the sheet 24. These sheets are laminated and bonded together integrally.

The sheets 23 for fixed contacts and the sheet 25 for movable contacts are each provided with a large number of contacts (not shown) formed of silver for example, the contacts on both sheets being in an opposed relation vertically at the position of a hole 24a formed in the sheet 24 for a spacer, to constitute the switch member 22.

The keyboard device K is provided with a holding member 26 formed on the switch member 22 by molding of a synthetic resin, a plurality of link members 27 mounted to the holding member 26 and each comprising two support pieces crossing each other and adapted to fall down and thereby movable vertically, a plurality of key-tops 28 secured to the link members 27, and dome members 29 formed of rubber whose upper portions are opposed to the key-tops 28 and whose lower portions are secured to the holding member 26.

The keyboard device K of such a construction operates in the following manner. When a key-top 28 is depressed, the associated link member 27 falls down and the associated dome member 29 is pushed by the key-top 28 and is thereby deformed and inverted. Wit dome member 29, the sheet 25 for movable contacts is pressed and comes into contact with the associated contact on the sheet 23 for fixed contacts. In this way there is made switch-over from one contact to another.

When the pressure on the key-top 28 is released, the sheet 25 for movable contacts leaves the sheet 23 for fixed contacts to make switch-over of contacts. At the same time, the dome member 29 reverts to its original state by virtue of its own elasticity, and with the dome member 29, both key-top 28 and link member 27 also revert to their original states.

As shown in FIGS. 9 and 10, the keyboard device K of the above construction is mounted within a box-shaped case 31 provided with a lid 30 which can be opened and closed, to constitute a personal computer P.

In the personal computer P, a printed circuit board 32 with constituents of various control circuits being connected by wiring is housed within the case 31.

On the printed circuit board 32 is disposed an IC component 33 which generates a large quantity of heat, and the support plate 21 of the keyboard K is positioned on the IC component 33.

The spacing between the IC component 33 and the support plate 21 is very small and both are very close to each other, nearly in contact with each other, to meet the recent demand for a thinner structure of the personal computer P.

Consequently, when the personal computer P is in use, the IC component 33 generates heat, so that the support plate 21 as a metallic plate positioned near the IC component 33 is heated. Consequently, the sheets 23 and 25 for fixed and movable contacts of the switch member 22 positioned on the thus-heated support member 21 are affected.

Thus, the conventional keyboard device K involves the problem that since the switch member 22 is mounted on the support plate 21 located near the IC component 33 which generates heat, the heat generated from the IC component 33 is transmitted through the support plate 21 to the sheets 23 and 25 of the switch member 22, resulting in the sheets 23 and 25 being elongated and causing a contact defect.

There also is a problem such that the generation of heat from the IC component 33 causes a performance defect of the IC component, which may lead to malfunction of the personal computer P.

SUMMARY OF THE INVENTION

According to the first means adopted by the present invention for solving the above-mentioned problems there is provided a keyboard device comprising key-tops, a switch member which is operated by operation of the key-tops, and a support plate for supporting the switch member, with a cooling heat pipe containing a coolant being formed integrally with the support plate.

According to the second solving means adopted by the invention, the cooling heat pipe is positioned in a hole formed in the support plate.

According to the third solving means adopted by the invention, the support plate is formed with a pipe for integral construction of both the support plate and the cooling heat pipe.

According to the fourth solving means adopted by the invention there is provided a keyboard device comprising key-tops, a switch member which is operated by operation of the key-top, and a cooling heat pipe containing a coolant and supporting the switch member, the cooling heat pipe being disposed on the whole lower surface of the switch member.

According to the fifth solving means adopted by the invention there is provided a keyboard device comprising key-tops, a switch member which is operated by operation of the key-tops, and a box-shaped cooling member containing a coolant in the interior thereof which is sealed hermetically, at least a part of the switch member being supported by the cooling member.

According to the sixth solving means adopted by the invention there is provided a keyboard device comprising key-tops, a holding member constituted by a metallic plate to hold the key-tops, a switch member which is operated by operation of the key-tops, and a support plate for supporting the switch member, with a cooling heat pipe containing a coolant being disposed on the lower surface of the holding member.

According to the seventh solving means adopted by the invention, the holding member is provided with a caulking portion which extends through the switch member and the support plate while keeping off the cooling heat pipe to fix the holding member to the support plate.

According to the eighth solving means, the cooling heat pipe is formed in the shape of a loop.

DETAILED DESCRIPTION OF PREFERRED EMBODIMENTS

Figure 1:
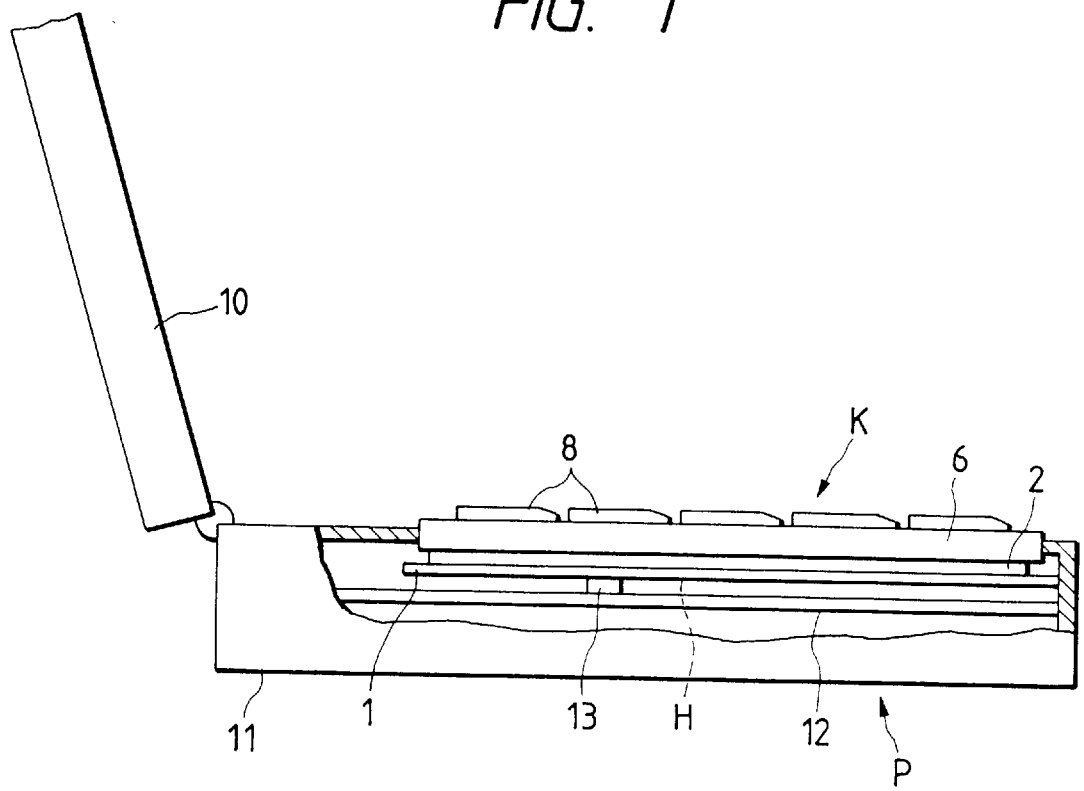
FIG. 1 is a sectional side view showing a principal portion of the keyboard device of the present invention as applied to a notebook type personal computer.
Figure 2:
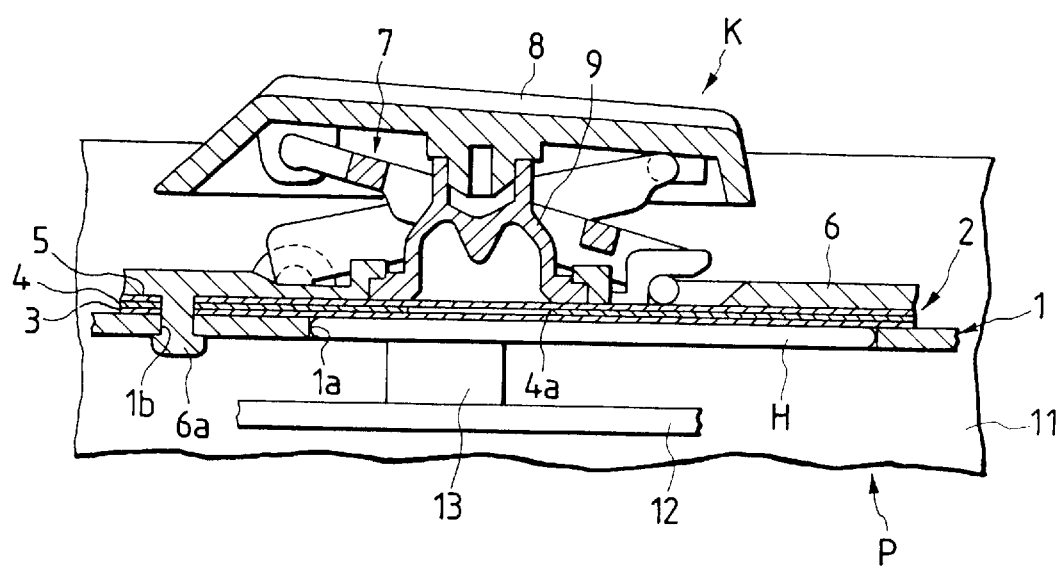
FIG. 2 is a sectional view of a principal portion thereof.
Figure 3:
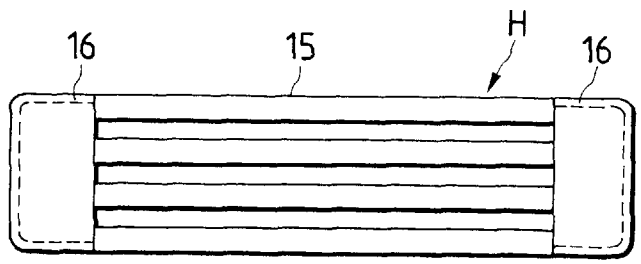
FIG. 3 is a plan view showing a first embodiment of a cooling heat pipe employable in the keyboard device of the present invention.
Figure 4:
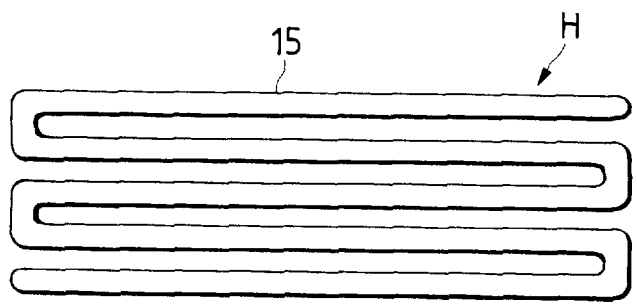
FIG. 4 is a plan view showing a second embodiment of a cooling heat pipe employable in the keyboard device of the present invention.
Figure 5:
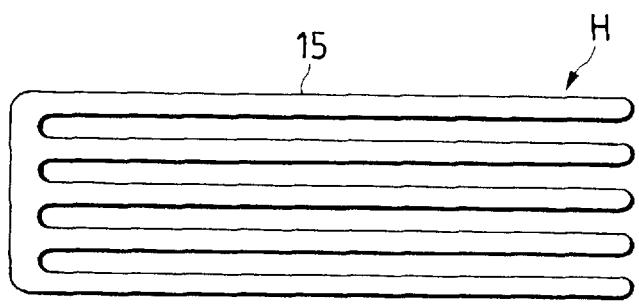
FIG. 5 is a plan view showing a third embodiment of a cooling heat pipe employable in the keyboard device of the present invention.
Figure 6:
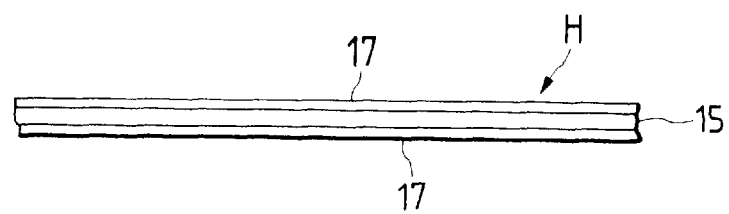
FIG. 6 is a side view showing a fourth embodiment of a cooling heat pipe employable in the keyboard device of the present invention.
Figure 7:
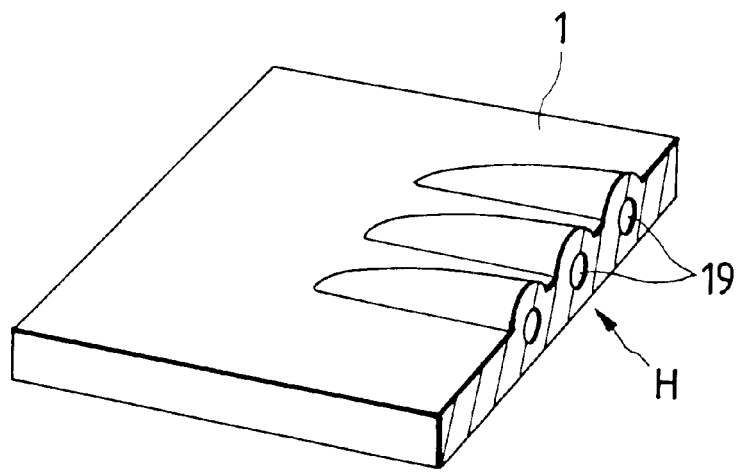
FIG. 7 is a sectional perspective view showing a principal portion of a fifth embodiment of a cooling heat pipe employable in the keyboard device of the present invention.
Figure 8:
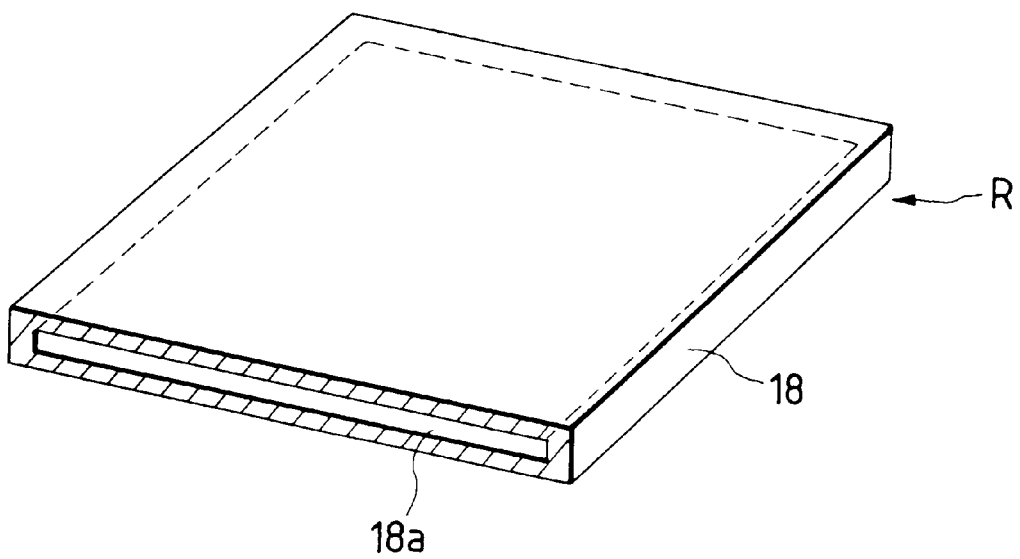
FIG. 8 is a sectional perspective view showing a principal portion of a cooling member used in the keyboard device of the present invention.
Figure 9:
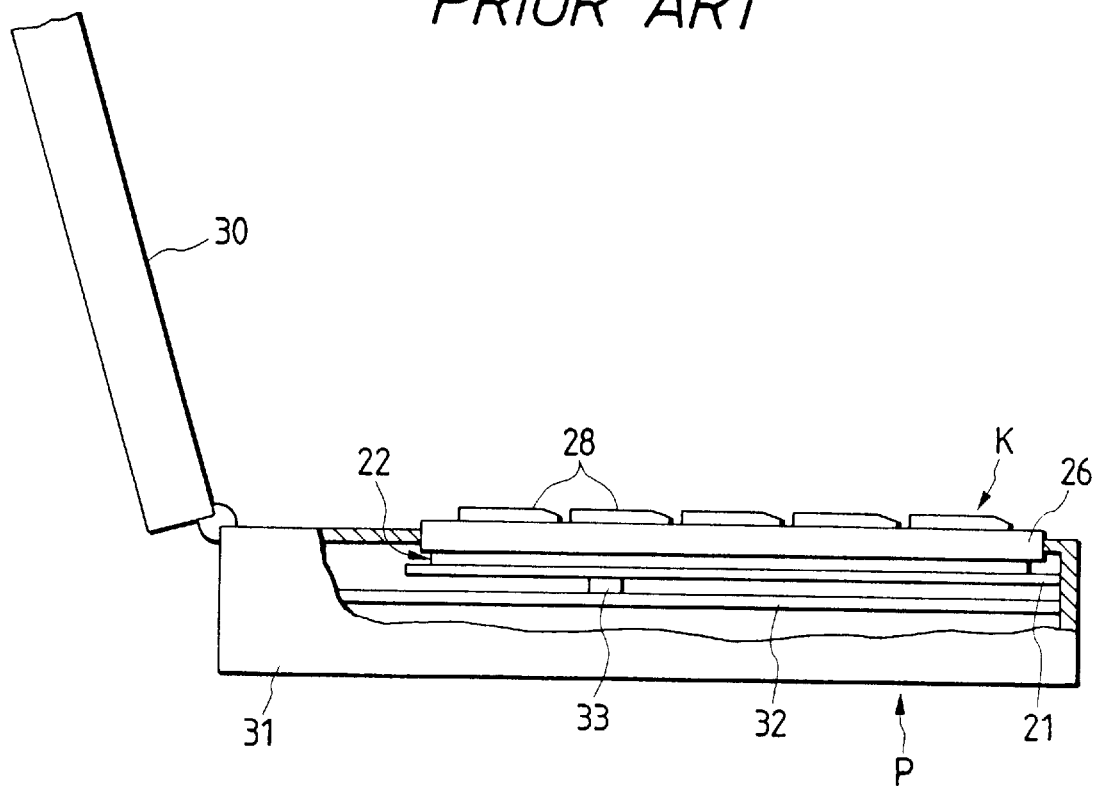
FIG. 9 is a sectional side view showing a principal portion of a conventional keyboard device as applied to a notebook type personal computer.
Figure 10:
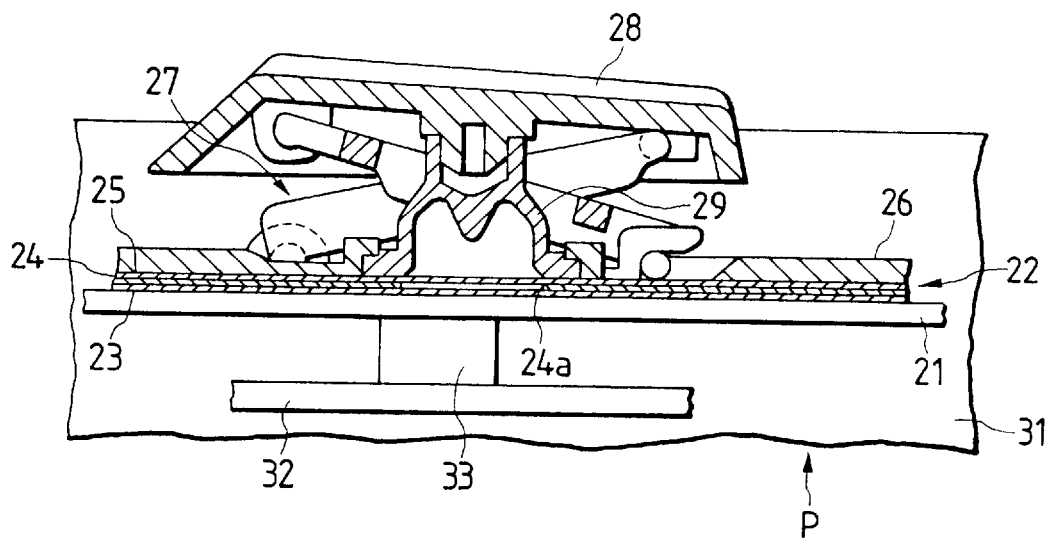
FIG. 10 is a sectional view of a principal portion thereof.

The keyboard device of the present invention will be described below with reference to FIGS. 1 to 8, of which FIG. 1 is a sectional side view showing a principal portion of the keyboard device of the present invention as applied to a notebook type personal computer, FIG. 2 is a sectional view of a principal portion thereof, FIG. 3 is a plan view showing a first embodiment of a cooling heat pipe employable in the keyboard device of the present invention, FIG. 4 is a plan view showing a second embodiment of a cooling heat pipe employable in the keyboard device of the present invention, FIG. 5 is a plan view showing a third embodiment of a cooling heat pipe employable in the keyboard device of the present invention, FIG. 6 is a side view showing a fourth embodiment of a cooling heat pipe employable in the keyboard device of the present invention, FIG. 7 is a sectional perspective view showing a principal portion of a fifth embodiment of a cooling heat pipe employable in the keyboard device of the present invention, and FIG. 8 is a sectional perspective view showing a principal portion of a cooling member used in the keyboard device of the present invention.

The keyboard device of the present invention, indicated at K, will now be described with reference to FIGS. 1 to 7. The keyboard device K has a support plate 1 constituted by a metallic flat plate, with a hole 1a being formed in the support plate 1. Within the hole 1a is disposed a cooling heat pipe H as shown in FIGS. 3 to 7 or a cooling member R. The pipe H or cooling member R is integral with the support plate 1.

The cooling heat pipe H comprises an aluminum pipe 15 and a coolant (not shown) such as, for example, liquid nitrogen contained in the interior cavity of the pipe 15.

FIG. 3 illustrates a first embodiment of a cooling heat pipe H, in which rectilinear pipes 15 containing coolant are arranged in parallel and hollow cylindrical portions 16 are integrally provided at both ends of the pipes 15 so that the pipes 15 and the cylindrical portions 16 are in communication with each other.

The cooling heat pipe H is formed by first integrally forming the pipes 15 by drawing and subsequent welding of the hollow cylindrical portions 16 to the pipes 15 by welding circumferentially.

FIG. 4 illustrates a second embodiment of a cooling heat pipe H, in which a single pipe 15 containing a coolant is meandered in a zigzag fashion.

FIG. 5 illustrates a third embodiment of a cooling heat pipe H, in which coolant-containing pipes 15 are formed in the shape of a comb-like loop.

FIG. 6 illustrates a fourth embodiment of a cooling heat pipe H, in which flat plates 17 are fixed to the upper and lower surfaces of each of the pipes 15 shown in FIGS. 3 to 5.

Only one of the flat plates 17 may be provided on either the upper surface or the lower surface of each of the pipes 15.

FIG. 7 illustrates a fifth embodiment of a cooling heat pipe H, which is formed integrally with a support plate 1. More specifically, the support plate 1 is formed of aluminum for example and pipes 19 are formed integrally with the support plate 1 by subjecting the hollow portions of the pipes 19 to drawing or applying a high pressure thereto to expand the hollow portions.

FIG. 8 illustrates an embodiment of a cooling member R, which comprises a square flat plate-like box 18 formed of aluminum, with a coolant such as liquid nitrogen (not shown) for example being contained in a cavity 18a of the box 18.

The cooling heat pipes H and the cooling member R may be modified into various other shapes and constructions. For example, in the above first embodiment, the pipes 15 may each be sealed at both ends thereof without using the cylindrical portions 16.

A switch member 2 is mounted on the support plate 1 and each of the cooling heat pipes H or the cooling member R.

The switch member 2 has a sheet 3 for fixed contacts formed by a filmy insulator, a sheet 4 for a spacer formed on the sheet 3 by a filmy insulator, and a sheet 5 for movable contacts formed on the sheet 4 by a filmy insulator. These sheets are integrally laminated and bonded together.

On the sheet 3 for fixed contacts and the sheet 5 for movable contacts are formed a large number of contacts (not shown) using silver for example. The contacts on the sheet 3 and the contacts on the sheet 5 are opposed to each other vertically at the position of a hole 4a formed in the sheet 4 for a spacer to constitute the switch member 2.

The keyboard device K comprises a holding member 6 mounted on the switch member 2 and constituted by a molded product of a synthetic resin or a metallic plate, a plurality of link members 7 secured to the holding member 6 and each comprising two support pieces crossing each other and adapted to fall down and thereby movable vertically, a plurality of key-tops 8 secured respectively to the link members 7, and dome members 9 formed of rubber, whose upper portions are opposed to the key-tops 8 and whose lower portions are secured to the holding member 6.

As shown in FIG. 2, the holding member 6 has a downwardly projecting caulking portion 6a. The caulking portion 6a is inserted through both a hole 2a of the switch member 2 and a small hole 1b of the support plate 1 and the tip thereof is then caulked to fix the holding member 6 and the switch member 2 to the support plate 1.

The keyboard device K constructed as above operates as follows. When a key-top 8 is depressed, the associated link member 7 falls down and at the same time the associated dome member 9 is pushed by the key-top 8 and is thereby deformed and inverted, so that the sheet 5 for movable contacts is pushed into contact with the contacts on the sheet 3 for fixed contacts, whereby there is made switch-over of contacts.

When the pressure on the key-top 8 is released, the sheet 5 for movable contacts leaves the sheet 3 for fixed contacts to effect switch-over of contacts. At the same time, the dome member 9 reverts to its original state by virtue of its own elasticity and consequently both key-top 8 and link member 7 also revert to their original states.

As shown in FIGS. 1 and 2, the keyboard device K is mounted within a box-shaped case 11 provided with a lid 10 which can be opened and closed. In this way a personal computer P is constituted.

Also disposed within the case 11 of the personal computer P is a printed circuit board 12 having wired components of various control circuits.

Further, onto the printed circuit board 12 is connected an IC component 13 by wiring which generates a large quantity of heat. On the IC component is positioned a cooling heat pipe H or a cooling member R integral with the support plate 1 of the keyboard device K.

Thus, the cooling heat pipe H or cooling member R is located in a corresponding relation to the mounted position of the IC component 13 which generates a large quantity of heat.

The spacing between the IC component 13 and the cooling heat pipe H or cooling member R is very close to each other, nearly in contact with each other, to meet the recent demand for a thinner structure of the personal computer. When the IC component 13 generates heat while the personal computer P is in use, this heat is transferred to the coolant through the pipe or pipes 15.

The coolant which is cold circulates in a successive manner to the heated portion to not only cool the IC component 13 but also prevent the rise in temperature of the sheets 3 and 5 for fixed and movable contacts of the switch member 2.

In the above embodiments the cooling heat pipe H or the cooling member R is disposed in the hole 1a of the support plate 1, but instead of the support plate 1 the cooling heat pipe H or the cooling member R may be formed throughout the whole lower surface of the switch member 2.

In this case, as shown in FIGS. 6, 7 or 8, such a cooling heat pipe or cooling member as has a flat plate-like upper surface is preferred.

Though not shown, there may be adopted a modification in which the cooling heat pipe H is laid on the lower surface of the holding member 6 formed of a metallic plate while keeping off the caulking portion 6a to cool the heat which has been transmitted thereto through the support plate 1 and the switch member 2, thereby preventing the rise in temperature of the switch member 2.

In the keyboard device of the present invention, as set forth above, the cooling heat pipe H containing a coolant is formed integrally with the support plate 1, so if the cooling heat pipe H is incorporated in the personal computer P in close proximity to the IC component 13 which generates a large quantity of heat, it is possible to cool the IC component 13 and the switch member 2 and hence possible to prevent elongation of the sheets 3 and 5, whereby the keyboard device is made free of any contact defect.

Besides, if the cooling heat pipe H is positioned in the hole 1a of the support plate 1, there can be provided a small-sized keyboard device superior in space factor and provided with cooling means.

Moreover, by forming pipes 19 in the support plate 1 and thereby forming the support plate 1 and the cooling heat pipe H integrally with each other, it is not only possible to cool the switch member 2 and the IC component 13 over a wide range but also possible to provide a cooling unit superior in assembling performance.

Further, if the cooling heat pipe H is used as a substitute for the support plate 1, it is possible to cool the IC component 13, suppress the rise in temperature of the switch member 2, further diminish the elongation of the sheets 3 and 5, and hence possible to provide a keyboard device capable of performing accurate contact motions.

In the case where the box-shaped cooling member R containing a coolant is used, if the cooling member R is incorporated in the personal computer P in close proximity to the IC component 13, it is possible to cool not only the IC component 13 but also the switch member 2 and hence possible to suppress elongation of the sheets 3 and 5, whereby there can be provided a keyboard device free of any contact defect.

Further, where the cooling heat pipe H containing a coolant is laid on the lower surface of the holding member 6, the cooling heat pipe H can prevent the switch member 2 from being heated by the IC component 13 which generates a large quantity of heat. Consequently, it is possible to suppress elongation of the sheets 3 and 5 of the switch member 2 and hence possible to provide a keyboard device free of any contact defect.

Further, if the cooling heat pipe H is laid while keeping off the caulking portion 6a of the holding member 6, not only the switch member 2 and the support plate 1 can be mounted by the holding member 6, but also the cooling heat pipe H can be laid efficiently, whereby there can be provided a small-sized keyboard device capable of performing accurate contact motions.

Additionally, by forming the cooling heat pipe H in the shape of a loop, it is possible to provide a keyboard device which permits a satisfactory circulation of coolant and which can ensure a high cooling efficiency over a long time.

What is claimed is:

1. A keyboard device comprising:

key-tops;

a switch member which is operated by operation of said key-tops, said switch member having an upper and lower surface; and a cooling heat pipe which contains a coolant, said cooling heat pipe having a flat plate-like upper surface which supports said switch member, wherein said cooling heat pipe is arranged such that said flat plate-like upper surface of said cooling heat pipe contacts said lower surface of said switch member directly.

2. A keyboard device comprising:

key tops;

a holding member constituted by a metallic plate to hold said key-tops, said holding member having a lower surface;

a switch member which is operated by operation of said key-tops; and a support plate for supporting said switch member, wherein a cooling heat pipe containing a coolant is arranged below and in contact with said lower surface of said holding member.

3. A keyboard device according to claim 2, wherein said holding member is provided with a caulking portion, said caulking portion extending through both said switch member and said support plate such that said holding member is fixed to said support plate and wherein said caulking portion is arranged to be in indirect contact with said cooling heat pipe.

4. A keyboard device comprising:

keytops;

a switch member which is operated by operation of said keytops; and a support plate for supporting said switch member;

wherein a cooling heat pipe containing a coolant is positioned in a hole formed in said support plate.

* * * * *

UNITED STATES PATENT AND TRADEMARK OFFICE
CERTIFICATE OF CORRECTION

PATENT NO. : 6,130,388
DATED : October 10, 2000
INVENTOR(S) : Akio Nishijima

Page 1 of 1

It is certified that error appears in the above-identified patent and that said Letters Patent is hereby corrected as shown below:

<u>Title page,</u>
After Item [22], insert a new item as follows,
-- Notice: This patent issued on a continued prosecution application filed under 37 CFR 1.53 (d), and is subject to the twenty year patent term provisions of 35 U.S.C. 154 (a) (2) . --.

Signed and Sealed this

Nineteenth Day of March, 2002

Attest:

JAMES E. ROGAN
*Director of the United States Patent and Trademark Office*

*Attesting Officer*